(12) United States Patent
Dietz et al.

(10) Patent No.: US 9,748,888 B2
(45) Date of Patent: Aug. 29, 2017

(54) METHOD FOR OPERATING POWER SEMICONDUCTORS

(71) Applicant: SIEMENS AKTIENGESELLSCHAFT, München (DE)

(72) Inventors: Gunnar Dietz, Nürnberg (DE); Holger Hoffmann, Hessdorf (DE); Harald Hofmann, Nürnberg (DE); Michael Leipenat, Pommelsbrunn (DE); Stefan Völkel, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/864,309

(22) Filed: Sep. 24, 2015

(65) Prior Publication Data
US 2016/0094178 A1    Mar. 31, 2016

(30) Foreign Application Priority Data
Sep. 25, 2014 (DE) .......... 10 2014 219 474

(51) Int. Cl.
| | |
|---|---|
| *H02P 29/00* | (2016.01) |
| *H02M 1/08* | (2006.01) |
| *H02M 1/36* | (2007.01) |
| *H02P 29/68* | (2016.01) |
| *H02P 29/62* | (2016.01) |
| *H02M 1/00* | (2006.01) |
| *H02M 7/5387* | (2007.01) |
| *H02M 1/32* | (2007.01) |

(52) U.S. Cl.
CPC .......... *H02P 29/0088* (2013.01); *H02M 1/08* (2013.01); *H02M 1/36* (2013.01); *H02P 29/62* (2016.02); *H02P 29/68* (2016.02); *H02M 7/5387* (2013.01); *H02M 2001/0054* (2013.01); *H02M 2001/327* (2013.01); *Y02B 70/1491* (2013.01)

(58) Field of Classification Search
CPC .............................. H02M 1/08; H02P 21/0035
See application file for complete search history.

(56) References Cited

U.S. PATENT DOCUMENTS

| | | | |
|---|---|---|---|
| 5,959,428 A * | 9/1999 | Saito ........................ | H02H 7/08 318/705 |
| 6,369,544 B1 * | 4/2002 | Kadah .................. | F24F 11/0079 236/91 D |

(Continued)

FOREIGN PATENT DOCUMENTS

| | | |
|---|---|---|
| DE | 102013212262 A1 | 1/2014 |
| JP | 2010178582 A | 8/2010 |

*Primary Examiner* — Shawki S Ismail
*Assistant Examiner* — Muhammad S Islam
(74) *Attorney, Agent, or Firm* — Henry M. Feiereisen LLC

(57) ABSTRACT

A method for operating power semiconductors arranged in converters, includes measuring with a temperature sensor a temperature of at least one of the power semiconductors, performing a comparison of the temperature of the at least one power semiconductor with a reference temperature and providing a result of the comparison; activating a pre-heating phase for preheating the power semiconductors as a function of the result; during the pre-heating phase, defining a pre-heating current; and impressing the pre-heating current into an electrical load.

23 Claims, 3 Drawing Sheets

(56) References Cited

U.S. PATENT DOCUMENTS

| | | | |
|---|---|---|---|
| 8,102,095 B2 | 1/2012 | Hoffmann et al. | |
| 8,908,402 B2 | 12/2014 | Kopf | |
| 8,947,037 B2 | 2/2015 | Fuchs et al. | |
| 2003/0076232 A1* | 4/2003 | Sato | H02M 7/00 340/679 |
| 2005/0071090 A1* | 3/2005 | Katou | H02M 7/48 702/34 |
| 2006/0221527 A1* | 10/2006 | Jacobson | G01K 7/42 361/100 |
| 2009/0279337 A1* | 11/2009 | Hamatani | B60L 3/12 363/132 |
| 2013/0257177 A1* | 10/2013 | Jacobson | H02M 1/08 307/115 |
| 2014/0015461 A1* | 1/2014 | Ohba | H02P 6/20 318/472 |
| 2014/0028238 A1* | 1/2014 | Tsukamoto | H02M 7/48 318/504 |
| 2014/0321019 A1 | 10/2014 | Völkel | |

* cited by examiner

METHOD FOR OPERATING POWER SEMICONDUCTORS

CROSS-REFERENCES TO RELATED APPLICATIONS

This application claims the priority of German Patent Application, Serial No. 10 2014 219 474.1, filed Sep. 25, 2014, pursuant to 35 U.S.C. 119(a)-(d), the disclosure of which is incorporated herein by reference.

BACKGROUND OF THE INVENTION

The present invention relates to a method for operating power semiconductors.

The following discussion of related art is provided to assist the reader in understanding the advantages of the invention, and is not to be construed as an admission that this related art is prior art to this invention.

The electrical power loss in converters, which are suited for use for example in electric or hybrid vehicles for operating electric machines, is mainly generated or determined by their power semiconductors or power semiconductor modules. Aside from the types of power semiconductors used, for example IGBTs (Insulated Gate Bipolar Transistor) which are frequently used, the gate activation method has a decisive influence on the degree of the electrical power loss and thus on the efficiency of the converter. Closer evaluation of the switching behavior of power semiconductors indicates that a comparatively long duration in particular of the switch-off process of the power semiconductors represents a significant part of the entire electrical losses when switching power semiconductors.

During the switch-off process, the collector current of the power semiconductor, which flows through the power semiconductor in the conducting state, is reduced as a function of its rate of current rise, which results from the derivative $dI_C/dt$ of the collector current with regard to time t, until it assumes a value approaching zero. A small leakage current of the collector current can if necessary continue to flow. The rate of current rise of the collector current, in other words the gradient of the edge of the collector current, is also identified as a placeholder for the switch-off speed, which determines the duration of the switch-off process for the power semiconductor. It can be controlled by way of the gate activation of the power semiconductor. Depending on the switch-off speed, the collector-emitter voltage increases, as a function of an inductance L present on the direct voltage circuit (also known as inductance of the commutation circuit), beyond the direct voltage present on the intermediate DC circuit, wherein the collector-emitter switch-off overvoltage $\Delta V_{CE}$ which results therefrom is produced in accordance with the following formula:

$$\Delta V_{CE} = L * dI_C/dt.$$

For the power semiconductors, here in particular IGBTs, a maximum blocking collector-emitter voltage is specified in each case by the manufacturers, which if exceeded is expected to lead to the destruction of the power semiconductor. This maximum blocking collector-emitter voltage, often also referred to as nominal block voltage, is specified in the manufacturer's data sheet usually at a junction temperature of the power semiconductors of +25° C. Moreover, in respect of the junction temperature of the power semiconductors, reference is mainly made to the temperature of the power semiconductors or to the temperature on the power semiconductors. The power semiconductor must accordingly be used and operated such that a direct voltage $V_{DC}$ appearing on the intermediate DC circuit, which is still applied with the collector-emitter switch-off overvoltage $\Delta V_{CE}$ during the switch-off process of the power semiconductor, does not exceed the maximum blocking collector-emitter voltage $V_{CES}$, as described by the following formula:

$$V_{CES} > V_{DC} \Delta V_{CE}.$$

Accordingly, the rate of current rise of the collector current is in particular to be limited during operation of the power semiconductors regarding the respective value of the direct voltage on the intermediate DC circuit if necessary, in order to observe the indicated condition for the switching-off of the power semiconductor. This condition thus has a non-negligible influence on the duration of the switch-off processes of power semiconductors for many of its applications.

A robust design of the power semiconductor previously is currently accomplished in that the maximum collector-emitter voltage developing on the power semiconductor for a switch-off process at a maximum direct voltage on the intermediate DC circuit and at a maximum current (in other words also collector current through the power semiconductor), the maximum blocking collector-emitter voltage pre-determined by the manufacturer have to be observed.

For IGBTs which are operated on an intermediate DC circuit with a higher voltage, the maximum blocking collector-emitter voltage $V_{CES}$ is specified for instance with 650V at an ambient temperature of +25° C.

When such power semiconductors are now intended to be used in converters in order to drive electric or hybrid vehicles for instance, the power semiconductor must in most instances also be configured for negative temperatures. In accordance with manufacturer specifications, the maximum blocking collector-emitter voltage is specified with just 605V at a temperature of −40° C. for instance. This collector-emitter voltage, which is now reduced for the blocking ability of the power semiconductor, which primarily applies at lower temperatures on the fringe of the usability of the power semiconductor, is often defined by the user to include the entire temperature range.

It would therefore be desirable and advantageous to provide an improved method which ensures a reliable operation of power semiconductors over a defined temperature range, wherein the electrical losses can be reduced during the switch-off processes of the power semiconductors

SUMMARY OF THE INVENTION

According to one aspect of the present invention, a method for operating power semiconductors arranged in converters, includes measuring with a temperature sensor a temperature of at least one of the power semiconductors; performing a comparison of the temperature of the at least one power semiconductor with a reference temperature and providing a result of the comparison; activating a pre-heating phase for preheating the power semiconductors as a function of the result; during the pre-heating phase, defining a pre-heating current; and impressing the pre-heating current into an electrical load.

The invention is based on the recognition that the ambient temperatures, to which a power semiconductor is exposed during normal operation and depending on the field of application, significantly influence the temperatures on the power semiconductor in, which in turn may effect the switch-off speed of the power semiconductors, the duration of the switch-off process and thus the electrical losses generated by the power semiconductor. Quicker switch-off speeds for specific operating points of the power semiconductor contribute to reducing the duration of the switch-off processes and can thus also prevent a costly overdimensioning of the power semiconductors and other affected components.

Due to the reduced blockability of the power semiconductors at lower temperatures, only the collector-emitter voltage, which according to the data sheet from the manufacturer correlates with the correspondingly lowest temperature, has previously been used as a maximum blocking collector-emitter voltage for the design of the switch-off speeds in order to ensure the reliable use of the power semiconductors. One example of this was already mentioned.

When these restrictions are observed, the in particular lower temperatures developing mainly on the power semiconductor during normal operation accordingly have less of an influence on the switch-off speeds for the switch-off process of power semiconductors.

However, reducing the overall maximum blocking collector-emitter voltage over an entire temperature and working range of the power semiconductors, also means foregoing the potential for increasing the switch-off speeds at specific working points of the power semiconductors.

The inventive method now makes it possible to use power semiconductors after implementing the pre-heating phase for a range of ambient temperatures demanded by the user, in particular also at very low ambient temperatures of for instance −40° C., even though manufacturers of power semiconductors require a restriction of the maximum blocking collector-emitter voltage on power semiconductors for such low temperatures. The reference temperature, which can be selected in an application-specific manner, is thus used to define the temperature on the power semiconductor, below which the pre-heating phase is to be activated. The comparison of the reference temperature with the temperature that is actually detected on the power semiconductor then results in activation of the pre-heating phase, depending on the comparison condition, wherein the design of the temperature values and comparison conditions are application-specific. By means of the pre-heating current to be impressed into the electrical load during the pre-heating phase, the power semiconductors are heated to temperatures which lie outside the low temperatures for which the manufacturer restricts the maximum blocking collector-emitter voltage.

In the pre-heating phase, these restrictions must however be taken into account. The pre-heating current flowing through the power semiconductor as its collector current, is to be selected sufficiently small so that a collector-emitter switch-off overvoltage, which is added to the direct voltage present on the intermediate DC circuit, does not exceed the maximum blocking collector-emitter voltage, which may be restricted in the pre-heating phase, particularly during the switch-off process of the power semiconductors.

In order to cause the pre-heating current to flow through the power semiconductors, the power semiconductors must be connected to an electrical load. Electric machines are particularly suited as an electrical load, wherein the electric machines can often be operated both mechanically and also dynamically. The electrical load can however also be provided from other electro-technical connections, which are not suited to drives. These may be connections which consist of combinations of electric components such as e.g. coils, resistors and capacitors and are provided for a mechanically static use.

According to another advantageous feature of the invention, the pre-heating phase is activated when the temperature comparison result indicates that the temperature which was detected with the temperature sensor is lower than the reference temperature or the pre-heating phase is not activated when the temperature which was detected with the temperature sensor is greater than or equal to the reference temperature. This configuration in which comparison conditions determine when the pre-heating phase is activated or when the pre-heating phase is not activated, is an embodiment users of the method can select as one possibility. An explicit consideration such that the pre-heating phase is not activated according to the selected comparison conditions, reflects the recognition that the power semiconductors are not to be heated, also not unintentionally, above the temperature on the power semiconductor specified by the manufacturer, so that there is no risk of overheating for specific operating points of the power semiconductors.

According to another advantageous feature of the invention, the temperature, which was detected with the temperature sensor, is compared with a further reference temperature by means of a further temperature comparison and a further result of the further temperature comparison is provided. A further comparison of the temperature on the power semiconductor with a reference temperature to be defined by the user is now available for the method, by means of which the pre-heating phase can be influenced or monitored.

According to another advantageous feature of the invention, the activated pre-heating phase will remain active when the further temperature comparison result indicates that the temperature, which was detected with the temperature sensor, is lower than the further reference temperature or the activated pre-heating phase is deactivated, when the further temperature comparison result indicates that the temperature which was detected with the temperature sensor is greater than or equal to the further reference temperature. With this embodiment, it is possible to extend the pre-heating phase which was activated in response to the comparison of the temperature on the power semiconductor with the reference temperature, so long as permitted by comparison conditions of the further comparison of the temperature on the power semiconductor with the further reference temperature.

Particularly advantageous in this regard is a cascading of the pre-heating phase. Thus, pre-heating currents of different values can be associated with corresponding temperature comparisons. The further reference temperature and the further temperature comparison also ensure that in the event of an unexpectedly high heating of the power semiconductor, which may result during the pre-heating phase, the pre-heating phase can be deactivated in a targeted manner.

According to another advantageous feature of the invention, a duration of the pre-heating phase lies within the range of seconds, particularly within the range of up to one second. It is generally sufficient when a pre-heating phase that was activated based on the temperature comparison result lasts for up to one second. When the power semiconductor is not at a desired temperature level after the pre-heating phase, the pre-heating phase can be reactivated by way of the temperature comparison. When the pre-heating phase is activated, the pre-heating current flowing through the power semiconductor is impressed into the electrical load, in other words in particular into the electric machine, by means of clocked gate activation signals on the power semiconductor. A control which is possible for the provision of the gate activation signals is predominantly embodied as a vector control, also known as field-oriented control.

According to another advantageous feature of the invention, during the activated pre-heating phase, the pre-heating current, the provision of which is in particular also dependent on a vector control, is impressed into the electric machine, and no torque is generated in the electric machine, in particular on a shaft of the electric machine. This exemplary embodiment is used when the electric machine is at a standstill, the pre-heating phase is activated as a result of the temperature comparison and the pre-heating current impressed into the electric machine has virtually no torque-generating current component and is determined by the vector control, i.e., no torque is generated on the electric machine. In this case, the pre-heating current is virtually only formed from the magnetic flux-forming current components determined by means of the vector control.

According to another advantageous feature of the invention, the electric machine can be an asynchronous machine and the pre-heating current is impressed into the asynchronous machine during the pre-heating phase by means of a magnetization current, which is in particular a current component of the vector control for asynchronous machines.

According to another advantageous feature of the invention, the electric machine can be a synchronous machine and the pre-heating current is impressed into the synchronous machine during the pre-heating phase by means of a field-forming current, which is in particular a current component of the vector control for synchronous machines.

According to another advantageous feature of the invention, the electric machine can be operated with a torque, which acts in particular on a mechanical shaft of the electric machine, and is impressed into the electric machine during the activated pre-heating phase at the same time as the pre-heating current, the provision of which is in particular also dependent on a vector control. This exemplary embodiment is used when the electric machine is not at a standstill, the pre-heating phase is activated as a result of the temperature comparison and the pre-heating current is impressed into the electric machine as part of a magnetic flux-forming current component of the vector control. In addition, a torque-forming current component of the vector control is to this end impressed into the electric machine for the torque of the electric machine and if necessary a further part of the magnetic flux-forming current component of the vector control. Therefore only one part of the magnetic flux-forming current component is if necessary used for the pre-heating current if the electric machine is operated with torque.

According to another aspect of the invention a computing unit is proposed for implementing the inventive method of operating power semiconductors, wherein the computing unit has at least one temperature input for receiving the temperature, which was detected by means of the temperature detection, and a signal output for outputting control signals, which are provided to generate gate activation signals for gates of the power semiconductor.

Software, which is provided to execute the inventive method, runs in the computing unit on computer processors. The software performs inter alia the temperature comparisons of the inventive method, activation and implementation of the pre-heating phase, and, based on the active pre-heating phase, the values of the current components to be determined by means of the vector control for the pre-heating current. The software provides the control signals for forming the gate activation signals for the power semiconductor, the clocked gate activation of which generates the pre-heating current.

According to another aspect of the invention feature of the invention, a computer program is configured for operating the computing unit. This computer program implements the temperature comparisons of the inventive method, the activation and execution of the pre-heating phase, and, based on the active pre-heating phase, includes the values of the current components to be determined by means of the vector control for the pre-heating current. It can also be realized as part of a subordinate computer program, wherein corresponding communication connections and communication protocols are to be provided. An integration of the computer program into distributed hardware-encompassing software systems is likewise possible.

According to another advantageous feature of the invention, a computer program product, has the inventive computer program stored thereon. In addition to electric and mechanical storage media fixedly installed in order to store the computer program, hard disk memories are often provided here, the computer program product can also be configured as a removable storage medium. These removable storage media may include memory sticks for USB applications, memory cards, CDs and DVDs. To be able to transfer data of the computer program or parts of the computer program onto storage media provided for this purpose whenever necessary, mains-borne electric networks and also networks are used which transmit data at least partially without electric lines.

According to another advantageous feature of the invention, an activation apparatus is proposed for the gate activation of the power semiconductors, which is configured to execute the inventive method with the inventive computing unit and has at least one signal input, which is suited in particular to receiving control signals in order to generate gate activation signals for the power semiconductor, and gate activation signal outputs, which are suited to outputting gate activation signals to gates of the power semiconductors. The activation apparatus receives the control signals of the computing unit, which are clocked and pulse-modulated by means in particular of the vector control. From the control signals the activation apparatus generates gate activation signals, which are output to the gates of the power semiconductor. The power semiconductors are switched by means of these gate activation signals such that during the pre-heating phase, the pre-heating current is impressed into the electric machine. The pre-heating phase is repeatedly activated or can remain activated until the power semiconductors have reached a temperature which no longer requires restriction of the maximum blocking collector-emitter voltage.

According to another aspect of the invention, a converter includes power semiconductors arranged in the converter; a temperature sensor for measuring a temperature of the power semiconductors; a computing unit, the computing unit including a temperature input for receiving the temperature of at least one of the power semiconductors measured with the temperature sensor, and a signal output, the computing unit being configured to perform a comparison of the measured temperature with a reference temperature and to provide a result of the comparison, to activate a pre-heating phase for preheating the power semiconductors as a function of the result, to generate control signals which are convertible into gate activation signals for gates of the power semiconductors and which define a pre-heating current impressed into the electric machine during the pre-heating phase in response to execution of the gate activation signals, and to output the control signals via the signal output; a computer program product and a computer program stored on the computer program product, the computer program being configured for operating the computing unit; an activation apparatus, including a signal input configured for receiving the control signals of the computing unit, and gate activation signal outputs, the activation apparatus being configured to generate the gate activation signals for the power semiconductor, and to output the gate activation signals to the gates of the power semiconductor via the gate activation signal outputs.

According to another aspect of the invention, an electric or hybrid vehicle has an inventive converter and an electric machine which can be operated by means of the converter, in particular an asynchronous machine or a synchronous machine.

High requirements in respect of reliability and service life are placed by manufacturers of such vehicles on electric and electronic components for the electric or hybrid vehicles. Vendors of converters, with which electric machines in electric or hybrid vehicles are to be operated, must thus ensure that their products are also operable, powerful and durable even under sometimes extreme environmental conditions. Therefore corresponding specifications for temperature ranges for example from −40° C. to +80° C. are rather conventional for electric or hybrid vehicles. Despite these specifications, the manufacturer of the electric or hybrid vehicles is not only interested in ensuring as far as possible an efficiency which makes the operation of the electric or hybrid vehicle feasible both technically and from a business perspective.

The inventive method is thus particularly well suited to ensuring reliable operation of the power semiconductors while at the same time further reducing the electrical losses in power semiconductors of the converter, thereby meeting in particular the requirements of the manufacturers of electric or hybrid vehicles.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
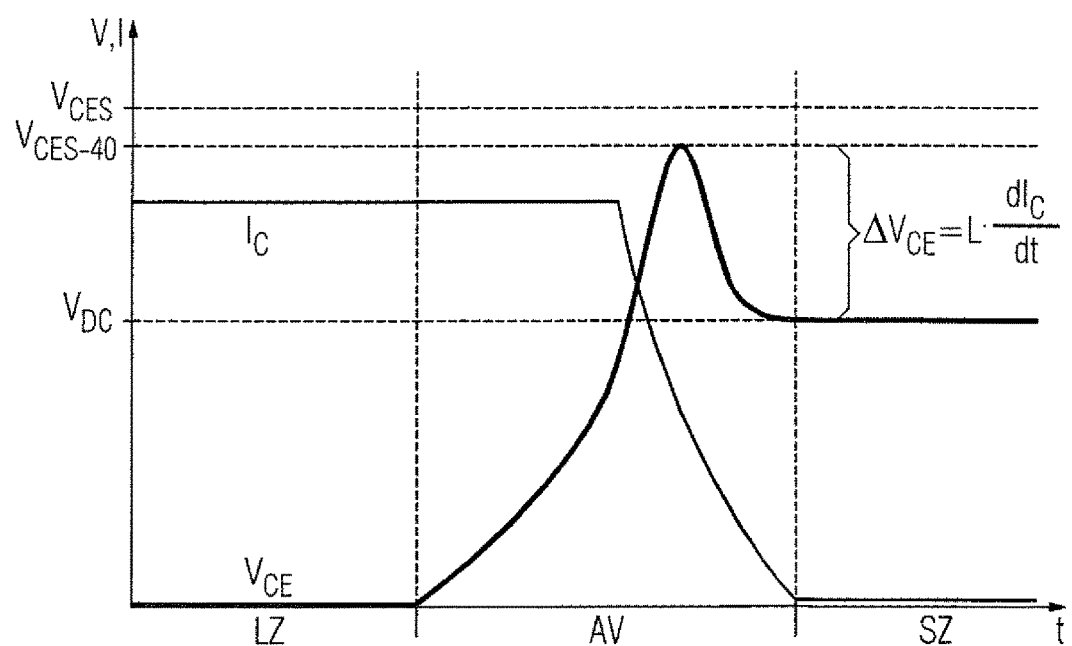
FIG. 1 shows a diagram with a collector-emitter voltages and a collector current $I_C$ during a switch-off process AV of power semiconductors.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a diagram with a collector-emitter voltage $V_{CE}$ and a collector current $I_C$, which describes, by way of example, a switch-off process AV of power semiconductors on an intermediate DC circuit by means of corresponding electrical parameters. A time t is plotted on an axis of the diagram, which displays a sequence and a duration of states of the power semiconductors, in other words a conducting state LZ and a blocking state SZ, together with the actual switch-off process of the power semiconductors.

Current I and voltage V are plotted on a further axis of the diagram in FIG. 1, wherein a collector current $I_C$ and a collector-emitter voltage $V_{CE}$ are thus in particular identified, by means of which a typical switch-off process AV can be operated in power semiconductors. For better understanding the switch-off process AV, further electric parameters are shown in the diagram, such as a maximum blocking collector-emitter voltage $V_{CES}$ of the power semiconductor, which is specified for temperatures on the power semiconductor of for instance +25° C., a maximum blocking collector-emitter voltage $V_{CES-40}$ of the power semiconductor at −40° C., a collector-emitter switch-off overvoltage $\Delta V_{CE}$ on the power semiconductor and a DC voltage $V_{DC}$ on the intermediate DC circuit.

The switch-off process AV, as can be inferred from the diagram in FIG. 1, starts from the state LZ which is conductive for the power semiconductor. The collector current $I_C$ flows in the conducting state LZ, depending on the required degree and in predetermined limits, through the power semiconductor, while the collector-emitter voltage $V_{CE}$ on the power semiconductor is virtually zero.

The collector-emitter voltage $V_{CE}$ increases continuously at the start of the switch-off process AV. The collector current $I_C$ starts to drop in a time-staggered manner, until it assumes a value approaching zero. A small leakage current may if necessary continue to flow. The collector-emitter voltage $V_{CE}$ briefly exceeds a value which is characteristic of the DC voltage $V_{DC}$ on the intermediate DC circuit during a break-down of the collector current $I_C$, which is represented by the collector-emitter switch-off overvoltage $\Delta V_{CE}$ indicated in FIG. 1.

Depending on the rate of current rise $dI_C/dt$ of the collector current $I_C$, which is a derivative of the collector current $I_C$ after time t, a value of the collector-emitter switch-off overvoltage $\Delta V_{CE}$ can also be determined, which is dependent on an inductance L (inductance of a commutation circuit) which is present on the direct voltage circuit. It must now generally be ensured that the collector-emitter voltage $V_{CE}$, together with the collector-emitter switch-off overvoltage $\Delta V_{CE}$, does not exceed the maximum blocking collector-emitter voltage $\Delta V_{CES}$ defined for the power semiconductor. FIG. 1 shows that the maximum blocking collector-emitter voltage $V_{CES-40}$ occurring for instance at −40° C. is also has to be taken into consideration and should not be exceeded, since it is significantly reduced as opposed to the maximum blocking collector-emitter voltage $V_{CES}$ at +25° C. The switch-off process AV is concluded, if the collector current $I_C$ is virtually zero and the collector-emitter voltage $V_{CE}$ has reached the value which is characteristic of the DC voltage $V_{DC}$, on the intermediate DC circuit and the power semiconductor is in the blocking state SZ.

Figure 2:
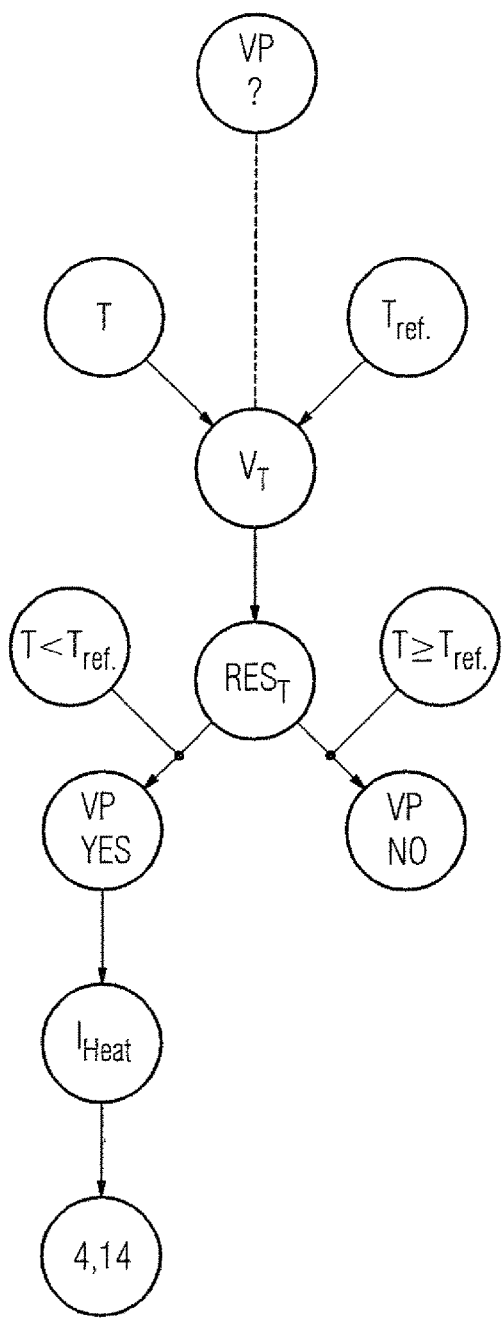
FIG. 2 shows a schematic representation of an exemplary embodiment of the inventive method for operating power semiconductors.

FIG. 2 shows a schematic representation of an exemplary embodiment of the inventive method for operating power semiconductors. In order to determine whether a pre-heating phase VP is required for pre-heating, i.e. for operating the power semiconductor, a temperature comparison $V_T$ is performed. The temperature comparison $V_T$ compares a temperature T on the power semiconductor, which was detected by means of a temperature sensor, with a reference temperature $T_{ref}$, which was defined in an application-specific manner. A temperature comparison result $RES_T$ provided by the temperature comparison $V_T$ is evaluated. When the temperature T on the power semiconductor is lower than the reference temperature $T_{ref}$, the pre-heating phase VP is activated and during the pre-heating phase VP, a pre-heating current $I_{Heat}$ is defined, which is impressed into an electrical load, in particular into an electric machine. If the evaluation of the temperature comparison result $RES_T$ indicates that the temperature T on the power semiconductor is equal to or greater than the reference temperature $T_{ref}$, the pre-heating phase VP is not activated.

Figure 3:
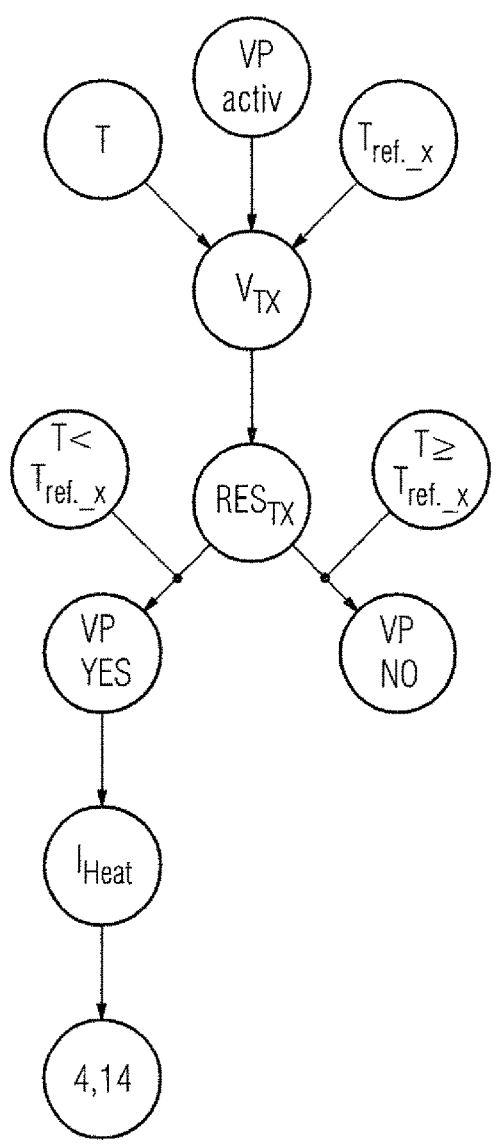
FIG. 3 shows a further schematic representation of an exemplary embodiment of the inventive method for operating power semiconductors.

A further schematic representation of an exemplary embodiment of the inventive method for operating power semiconductors is indicated in FIG. 3. Based on an already activated pre-heating phase VP, it is determined whether the pre-heating phase VP is still required to heat up the power semiconductors or has to be extended or reactivated. In the meantime a temperature T which is critical to the power semiconductor could also be reached during an activated pre-heating phase VP, which should result in deactivation of the pre-heating phase VP.

A further temperature comparison $V_{TX}$ is therefore performed, in which the temperature T on the power semiconductor is compared with a further reference temperature $T_{ref_X}$, which was likewise defined in an application-specific manner. A temperature comparison result $RES_{TX}$ provided by the further temperature comparison $V_{TX}$ is evaluated. When the temperature T on the power semiconductor is lower than the further reference temperature $T_{ref_X}$, the pre-heating phase VP remains activated through its duration or the duration of the pre-heating phase VP can also be extended. Similar to the embodiment shown in FIG. 2, the pre-heating current $I_{Heat}$ is impressed into the electrical load, in particular into the electric machine, during the now ongoing or newly activated pre-heating phase VP. If the evaluation of the further temperature comparison result $RES_{TX}$ indicates that the temperature T on the power semiconductor is equal to or greater than the reference temperature $T_{ref_X}$, the pre-heating phase VP is deactivated.

The concrete comparison conditions (>, <, =, >=, <=) for the temperature comparison $V_T$ or the further temperature comparison $V_{TX}$ of the inventive method may depend on the specific circumstances and can be selected by a person with skill in the art accordingly.

Using the two exemplary embodiments of FIG. 2 and FIG. 3A, it is not necessary to a generally reduce the maximum blocking collector-emitter voltage $V_{CE}$, when power semiconductors are also to be used at correspondingly low temperatures. After performing the pre-heating phase VP, a desired heating-up of the power semiconductor is ensured. During further operation of the power semiconductor, its power loss can be reduced, since in this case the maximum blocking collector-emitter voltage $V_{CES-40}$ occurring at −40° C. no longer has to be taken into consideration.

Figure 4:
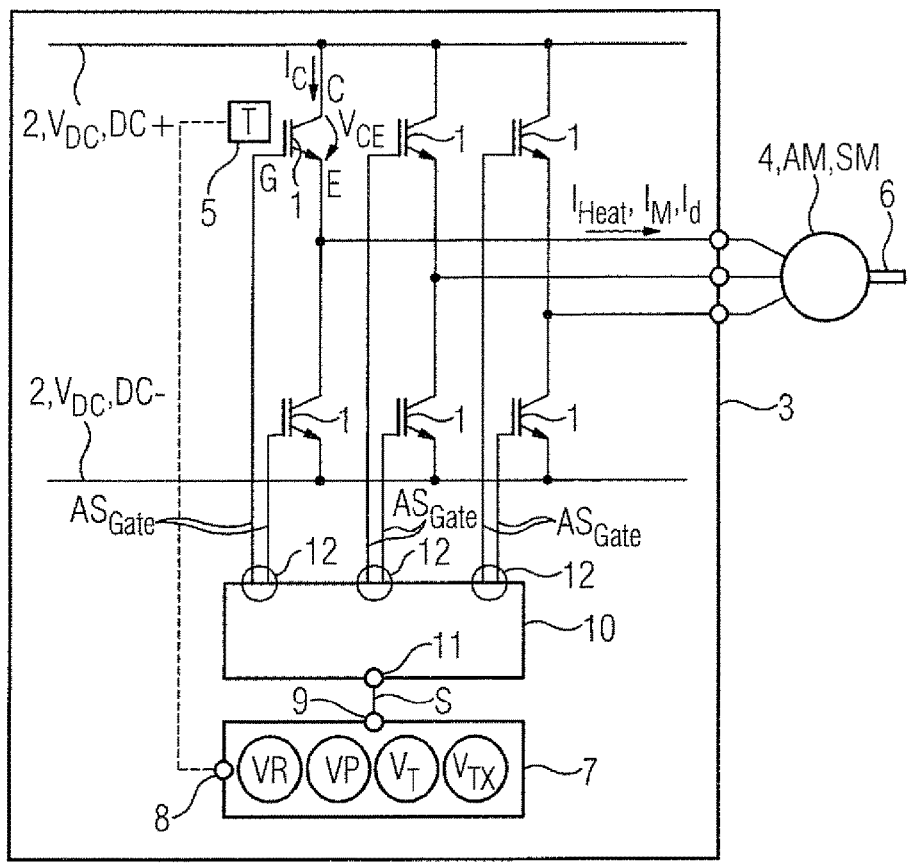
FIG. 4 shows a schematic diagram of a converter with power semiconductors on the intermediate DC circuit, having a computing unit and an activation apparatus and an electric machine, AM, SM powered by the converter.

FIG. 4 shows a schematic diagram of a converter 3 with power semiconductors 1 on the intermediate DC circuit 2, having a computing unit 7 and an activation apparatus 10 and an electric machine 4, AM, SM powered by the converter 3.

The converter 3 is operated on an intermediate DC circuit 2 with a DC voltage $V_{DC}$, which has a positive DC voltage potential DC+ and a negative DC voltage potential DC−. Power semiconductors 1, in particular IGBTs, are arranged on the intermediate DC circuit 2 between the two DC voltage potentials DC+, DC− of the DC voltage $V_{DC}$. These power semiconductors 1 in each case have a gate G, a collector C and an emitter E, (only shown on one of the power semiconductors 1 in FIG. 4). Depending on the application, power semiconductors 1 are often structurally combined in a module, which allows for a compact design. The modules can for instance be embodied as a six pulse bridge circuit (as shown in particular in FIG. 4) or also as individual half bridge circuits.

The converter 3 is provided to drive an electric machine 4, AM, SM or to receive energy during the dynamic operation of the electric machine 4. The electric machine 4 is electrically connected to the power semiconductors 1 arranged on the intermediate DC circuit 2 by means of a three-phase connection.

Moreover, a temperature sensor 5 for detecting a temperature T is arranged on one of the power semiconductors 1, wherein further temperature sensors 5 can be arranged on corresponding power semiconductors 1. The temperature sensor 5 is linked to a temperature input 8 of a computing unit 7, in order to provide the temperature T to the computing unit 7. The computing unit 7 is capable of performing at least one temperature comparison $V_T$ for implementing the inventive method, a further temperature comparison $V_{TX}$, pre-heating phase VP and a vector control VR.

When the pre-heating phase VP is activated, the computing unit 7 outputs the control signals S defined as a function of the vector control VR in order to generate gate activation signals $AS_{Gate}$ for gates G of the power semiconductor 1 on a signal output 9.

The activation apparatus 10 receives the control signals S by means of a signal input 11, and determines the corresponding gate activation signals $AS_{Gate}$. The gate activation signals $AS_{Gate}$ are transmitted to the gates G by means of gate activation signal outputs 12, in order to switch the gates G of the power semiconductors 1. The power semiconductors 1 now impress a pre-heating current $I_{Heat}$ into the electric machine 4 during an activated pre-heating phase VP.

When an asynchronous machine AM is used as an electric machine 4, which is operated with or without torque on its shaft 6, the pre-heating current $I_{Heat}$, during the activated pre-heating phase VP, is either part of a magnetization current $I_M$ of the asynchronous machine AM or corresponds entirely with the magnetization current $I_M$ of the asynchronous machine AM.

When a synchronous machine SM is used as an electric machine 4, which is operated with or without torque on its shaft 6, the pre-heating current $I_{Heat}$, during the activated pre-heating phase VP, is either part of a field-forming current $I_d$ of the synchronous machine SM or corresponds entirely with the field-forming current $I_d$ of the synchronous machine SM.

Figure 5:
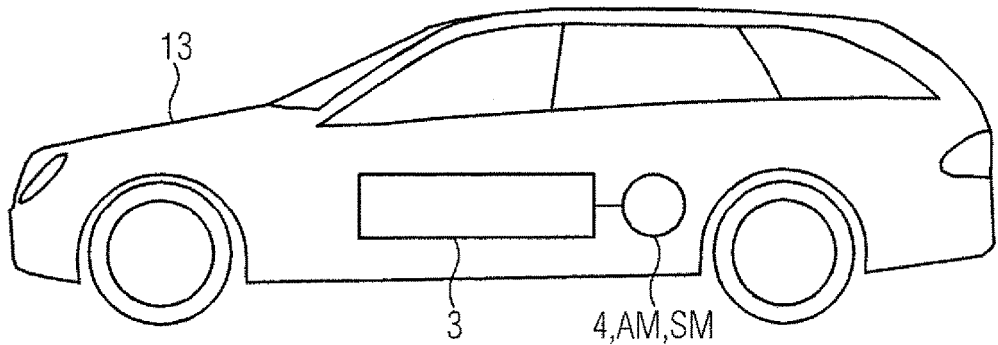
FIG. 5 shows a schematic representation of an electric or hybrid vehicle with a converter 3 and an electric machine, AM, SM powered by the converter.

FIG. 5 schematically shows an electric or hybrid vehicle 13, which has the converter 3. The converter 3 is provided to drive an electric machine 4. This electric machine can be an asynchronous machine AM or a synchronous machine SM. Moreover, the converter 3 can feed back electrical energy output by the electric machine 4, AM, SM for instance during braking into the electric or hybrid vehicle 13. The inventive method is particularly suited to use of this type in electric or hybrid vehicles 13.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating power semiconductors arranged in converters, comprising:
    measuring with a temperature sensor a temperature of at least one of the power semiconductors;
    performing a comparison of the temperature of the at least one power semiconductor with a reference temperature and providing a result of the comparison;
    activating a pre-heating phase for preheating the power semiconductors as a function of the result, said pre-heating phase being activated resulting in an increase in $I_{HEAT}$ when the result indicates that the temperature of the at least one power semiconductor is lower than the reference temperature and a collector current $I_C$ is dropped to a value approximating zero, and wherein the pre-heating phase is not activated when the result indicates that the temperature of the at least one power semiconductor is greater than or equal to the reference temperature, wherein a duration of the pre-heating phase lies within a range of seconds;
    during the pre-heating phase, defining a pre-heating current; and
    impressing the pre-heating current into an electrical load.

2. The method of claim 1, wherein the power semiconductors are arranged on an intermediate DC circuit of the converters.

3. The method of claim 1, wherein the electrical load is an electric machine connected to the power semiconductors.

4. The method as of claim 1, further comprising performing a further comparison of the temperature of the at least one power semiconductor with a further reference temperature and providing a further result of the further comparison.

5. The method of claim 1, wherein the duration of the pre-heating phase is within a range of up to one second.

6. The method of claim 1, wherein, during an activated state of the pre-heating phase, the pre-heating current is impressed into the electric machine, and wherein the pre-heating current generates no torque in the electric machine.

7. The method of claim 1, wherein the pre-heating current generates no torque on a shaft of the electric machine.

8. The method of claim 1, wherein the electric machine is operated with a torque, which acts on a mechanical shaft of the electric machine, and wherein during an activated state of the pre-heating phase the pre-heating current is impressed into the electric machine.

9. The method of claim 4, wherein the pre-heating phase, when activated in the activating step, remains active when the further result indicates that the temperature of the at least one power semiconductor is lower than the further reference temperature, and wherein the pre-heating phase when activated in the activating step is deactivated when the further result indicates that the temperature of the at least one power semiconductor is greater than or equal to the further reference temperature.

10. The method of claim 6, wherein the electric machine is constructed as an asynchronous machine and the pre-heating current is impressed into the asynchronous machine during the pre-heating phase by means of a magnetization current.

11. The method of claim 6, wherein the electric machine is a synchronous machine and the pre-heating current is impressed into the synchronous machine during the pre-heating phase by means of a field-forming current.

12. The method of claim 7, wherein the pre-heating current is provided as a function of a vector control.

13. The method of claim 8, wherein the pre-heating current is provided as a function of a vector control.

14. The method of claim 10, wherein the magnetization current is a current component of a vector control for asynchronous machines.

15. The method of claim 11, wherein the field-forming current is a current component of a vector control for synchronous machines.

16. A computing unit, comprising:
    a temperature input unit for receiving a measured temperature of at least one of a plurality of power semiconductors arranged in converters of an electric machine; and
    a signal output unit,
    said computing unit being configured
    to perform a comparison of the measured temperature with a reference temperature and to provide a result of the comparison,
    to activate a pre-heating phase for preheating the power semiconductors as a function of the result, said pre-heating phase being activated resulting in an increase in $I_{HEAT}$ when the result indicates that the temperature of the at least one power semiconductor is lower than the reference temperature and a collector current $I_C$ is dropped to a value approximating zero, and wherein the pre-heating phase is not activated when the result indicates that the temperature of the at least one power semiconductor is greater than or equal to the reference temperature, wherein a duration of the pre-heating phase lies within a range of seconds,
    to generate control signals which are convertible into gate activation signals for gates of the power semiconductors and which define a pre-heating current impressed into the electric machine during the pre-heating phase in response to execution of the gate activation signals, and
    to output the control signals via the signal output.

17. A computer program configured for operating the computing unit of claim 16.

18. An activation apparatus, comprising:
    a signal input configured for receiving the control signals generated by the computing unit of claim 16; and
    gate activation signal outputs, said activation apparatus being configured
    to generate the gate activation signals for the power semiconductor as a function of the control signals, and
    to output the gate activation signals to the gates of the power semiconductor via the gate activation signal outputs.

19. A computer program product, on which the computer program of claim 17 is stored.

20. A converter, comprising:

power semiconductors arranged in the converter;

a temperature sensor for measuring a temperature of the power semiconductors;

a computing unit, said computing unit comprising a temperature input for receiving the temperature of at least one of the power semiconductors measured with the temperature sensor, and a signal output, said computing unit being configured to perform a comparison of the measured temperature with a reference temperature and to provide a result of the comparison, to activate a pre-heating phase for preheating the power semiconductors as a function of the result, said pre-heating phase being activated resulting in an increase in $I_{HEAT}$ when the result indicates that the temperature of the at least one power semiconductor is lower than the reference temperature and a collector current $I_C$ is dropped to a value approximating zero, and wherein the pre-heating phase is not activated when the result indicates that the temperature of the at least one power semiconductor is greater than or equal to the reference temperature, wherein a duration of the pre-heating phase lies within a range of seconds, to generate control signals which are convertible into gate activation signals for gates of the power semiconductors and which define a pre-heating current impressed into the electric machine during the pre-heating phase in response to execution of the gate activation signals, and to output the control signals via the signal output;

a computer program product and a computer program stored on the computer program product, said computer program being configured for operating the computing unit, an activation apparatus, comprising a signal input configured for receiving the control signals of the computing unit, and gate activation signal outputs, said activation apparatus being configured to form the gate activation signals for the power semiconductor, and to output the gate activation signals to the gates of the power semiconductor via the gate activation signal outputs.

21. The converter of claim 20, further comprising an intermediate DC circuit.

22. An electric or hybrid vehicle, comprising the converter of claim 20, and an electric machine operable by the converter.

23. The electric or hybrid vehicle of claim 22, wherein the electric machine is constructed as an asynchronous machine or a synchronous machine.

* * * * *